July 29, 1958   A. PERCHINSKY   2,844,909
CASTER HOLDERS
Filed April 15, 1957
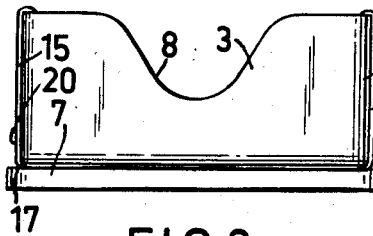
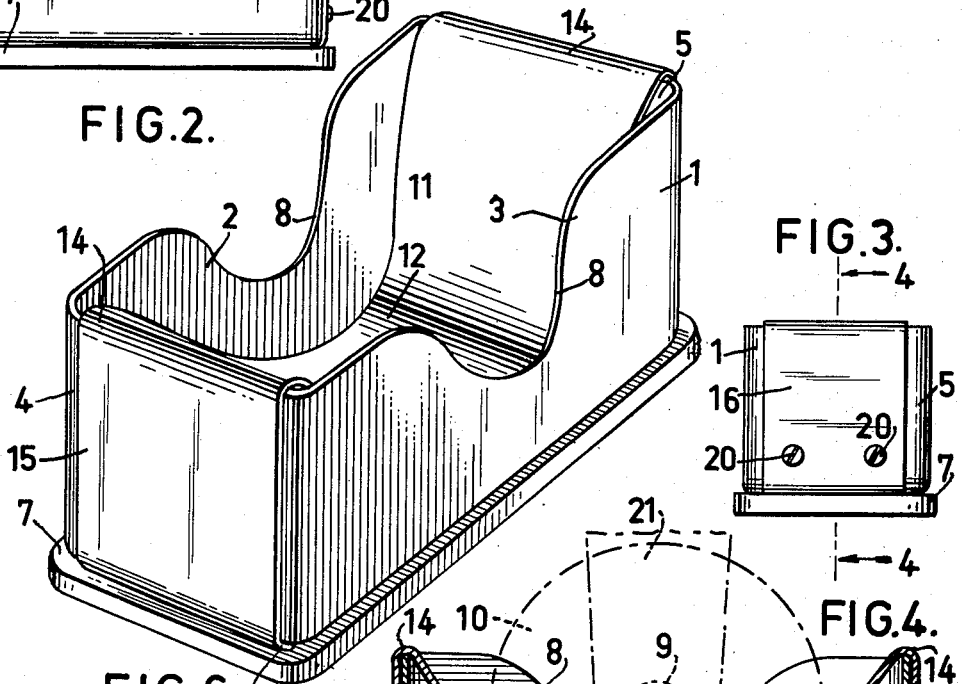
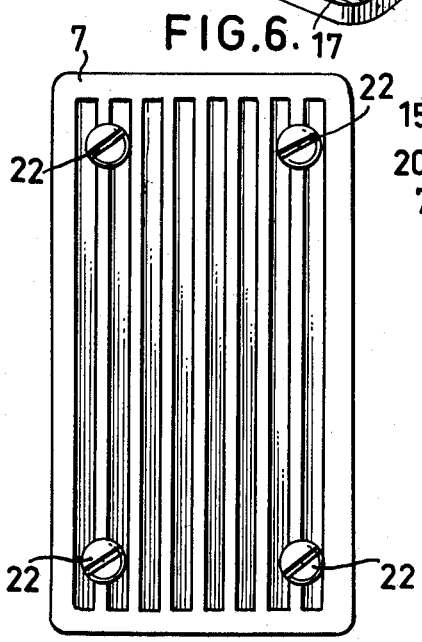
INVENTOR.
Andrew Perchinsky
BY
Harry Radzinsky
Attorney United States Patent Office 2,844,909
Patented July 29, 1958

2,844,909
CASTER HOLDERS

Andrew Perchinsky, Binghamton, N. Y., assignor to George E. Treyz, Binghamton, N. Y.

Application April 15, 1957, Serial No. 653,034

4 Claims. (Cl. 45—137)

This invention relates to caster-receiving supports for machinery, for articles of furniture, for apparatus of various kinds and many other articles, and particularly intended for use during transportation of such articles on trucks, trains or other vehicles. Many machines, for example, exceed a ton or more in weight and are provided at the bottom with rollers or casters. Therefore, the problem of preventing such machines from shifting or moving about, and particularly during shipping or transportation, is an important one.

It is therefore one of the objects of the present invention to provide a support or restraining device into which the casters, legs or other lower parts of machines, furniture or other heavy articles can be inserted and which will restrain the articles from movement. While it is suggested that the devices to be described are particularly useful during shipment of the machines, furniture and the like, the supports are equally useful while the articles are immobile, since they will retain the machine or other article in a given position, will prevent it from moving about on the surface of a floor and marring the floor and will provide other advantages apparent to those to whom this article is useful.

More particularly, the invention contemplates the provision of a cup provided on its bottom or under surface with a non-slip material, such as ribbed rubber, and formed with a well or concavity into which the caster on a machine, article of furniture or other article is placed, the concavity being arcuately shaped to closely fit the roller of the caster and prevent its movement. In the embodiment of the invention herein disclosed, the concavity or well within which the caster is placed is formed from a strip of sheet metal of undulated formation, which fits between the side walls of the cup and has its ends extended over the top edges of the end walls of the cup and extended down on the outside of the same and rigidly secured to such end walls. This results in a rigid, sturdy structure capable of withstanding hard use and the abuse to which articles of this nature might be put.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a perspective view of a caster support constructed according to the invention;

Fig. 2 is a side elevational view on a reduced scale of the caster support;

Fig. 3 is an end elevational view of the same;

Fig. 4 is a sectional view, taken substantially on the line 4—4 of Fig. 3, looking in the direction of the arrows;

Fig. 5 is a transverse sectional view through the support, and

Fig. 6 is a view looking at the bottom of the support.

The body or shell of the device is preferably composed of heavy metal and is made in the form of a rectangular cup generally indicated at 1. The body 1 is provided with side walls indicated respectively at 2 and 3; with the two end walls indicated respectively at 4 and 5 and with a closed bottom shown at 6. Secured to the bottom wall 6 by screws 22 or other fastening means and exposed over the outer surface of the bottom wall, is a layer or facing of a non-slip material 7, which may be of ribbed or otherwise irregularly-surfaced rubber or non-slip material of similar characteristics. The side walls 2 and 3 are each notched, as shown at 8 in order to clear the axle 9 and yoke 21 of the caster 10, that is fitted within the support.

Fitted within the cup 1 is an undulated sheet metal strip member 11, which is downwardly curved to provide an arcuate concavity or seat 12 on the inside of the cup between the walls of the same. At the opposite ends of this curved portion 12 of the strip 11 the same is extended over and rests upon the top edges of the end walls 4 and 5, as indicated at 14 and then extended downwardly to lie in intimate contact with the end walls for their full length as indicated by the parts 15, 16. Screws or equivalent fastening elements 20 extend through these parts of the strip to securely fasten such parts to the end walls 4 and 5 of the cup. At its lower end, each of the parts 15 and 16 is formed with an integral, inturned lip 17 which extends under the lower end of the end walls 4 and 5 and is positioned between the bottom of the cup and the non-slip 7 material attached thereto. These lips 17, which are inturned below the end walls, form locking elements tending to restrain the parts 15 and 16 against rising movement and relieve strain on the fastening screws 20. Through the described arrangement, two-ply end walls are provided and a strong, sturdy structure results.

It will be noted that the non-slip material 7 protrudes slightly beyond the limits of the cup so that the lips 17, as well as all other metallic parts on the bottom of the cup, are prevented from contact with the floor or other surface upon which the support may be rested.

From the foregoing, the operation of the device will be readily apparent. The caster 10 provided on a machine, appliance, article of furniture or other objects, is inserted in the well or depression and the same will seat in the curvature or concavity 12 of the strip 11, the axle for the caster as well as the lower portion of the leg or other part in which the caster is secured, clearing the side walls 3 by means of the notches 8. When the machine or other article is placed in the support in the manner shown, and the support is rested on its non-slip lower surface 7, it will be apparent that the machine, resting on a number of these supports, will be immobilized and held against shifting movement, whether standing in an office, on a truck or any other vehicle. Since the casters fit within the depression or concavity provided in the device, they cannot roll out of it even under the most severe transportation conditions.

The device is of sturdy, rugged construction; the interior undulated strip 11, strongly reinforcing the end walls of the cup, adds great strength and rigidity to the device, and since there are no moving parts in it and all parts are firmly and permanently united, the device will withstand extremely hard use and abuse under the most severe conditions.

Having described a single embodiment of the invention, it is obvious that the same is not to be restricted thereto, but is broad enough to cover all structures coming within the scope of the annexed claims.

What I claim is:

1. A support of the character described comprising, a metal cup having side walls, end walls and a bottom, an undulated metal strip fitted within the cup and curved downwardly within the same to provide an arcuate supporting surface for a caster fitted into the cup and rested upon the strip, the strip having end portions resting on the upper edges of the end walls and extended down over and into close contact with the outer surfaces of said end walls for the entire height of said end walls, and fastening means extending through said downwardly-extending parts of the strip and into the end walls for attaching the end portions of the strip to the end walls of the cup.

2. A support of the character described comprising, a metal cup having side walls, end walls and a bottom, a non-slip material fastened to the outer surface of the bottom, a metal strip fitted within the cup and curved downwardly therein to provide a curved seat for a caster fitted within the cup and rested upon the curved portion of the strip, the strip extending over and resting on the tops of the end walls and extending downwardly and against the outer surfaces of said end walls for the entire height of said end walls, the end portions of the strip having inturned lips extended between the lower ends of the end walls and the non-slip material.

3. In a support as provided for in claim 2, including fastening elements extending through the downturned portions of the strip and into the end walls for securing said portions of the strip to the end walls, and fastening elements for attaching the non-slip material to the bottom of the cup.

4. A support of the character described comprising, a rectangular metal cup having side walls, end walls and a bottom, the side walls having notches extending downwardly from their upper edges, an undulated metal strip fitted within the cup and being downwardly curved within the cup to provide a curved rest for a caster with the caster mounting and axle being cleared by the notched parts of the side walls, the strip having its ends extending over and resting on the upper edges of the tops of the end walls and extending downwardly along the outer side of said walls and terminating in inturned lips at the bottom of the end walls.

References Cited in the file of this patent

UNITED STATES PATENTS

| | | |
|---|---|---|
| 1,159,571 | Clark | Nov. 9, 1915 |
| 1,221,225 | Schauermann | Apr. 3, 1917 |
| 1,248,283 | Derck et al. | Nov. 27, 1917 |
| 1,538,998 | Michod | May 26, 1925 |
| 1,554,327 | Boberg | Sept. 22, 1925 |
| 1,562,817 | Wismer | Nov. 24, 1925 |
| 2,687,538 | Marzillier | Aug. 31, 1954 |